United States Patent
Bader et al.

(10) Patent No.: US 7,891,165 B2
(45) Date of Patent: Feb. 22, 2011

(54) EXHAUST CASING HUB COMPRISING STRESS-DISTRIBUTING RIBS

(75) Inventors: Valentine Bader, Vaux le Penil (FR); Laurent Pierre Elysee Gaston Marnas, Vaux le Penil (FR); Nicolas Pommier, Brunoy (FR); Christian Rene Schnell, Forges (FR)

(73) Assignee: SNECMA, Paris (FR)

( * ) Notice: Subject to any disclaimer, the term of this patent is extended or adjusted under 35 U.S.C. 154(b) by 35 days.

(21) Appl. No.: 12/139,089

(22) Filed: Jun. 13, 2008

(65) Prior Publication Data
US 2008/0307795 A1 Dec. 18, 2008

(30) Foreign Application Priority Data
Jun. 13, 2007 (FR) .................................. 07 55736

(51) Int. Cl.
*F04D 29/02* (2006.01)
(52) U.S. Cl. .............................. 60/39.5; 60/796; 60/805
(58) Field of Classification Search ................ 60/39.5, 60/796, 805; 415/182.1, 220
See application file for complete search history.

(56) References Cited
U.S. PATENT DOCUMENTS

| | | | |
|---|---|---|---|
| 5,020,318 A * | 6/1991 | Vdoviak | 60/226.1 |
| 5,634,767 A | 6/1997 | Dawson | |
| 6,164,903 A * | 12/2000 | Kouris | 415/135 |
| 6,358,001 B1 * | 3/2002 | Bosel et al. | 415/142 |
| 6,511,284 B2 * | 1/2003 | Darnell et al. | 415/115 |
| 6,854,960 B2 * | 2/2005 | Van Dine et al. | 416/191 |

FOREIGN PATENT DOCUMENTS

| | | |
|---|---|---|
| EP | 0 298 898 B1 | 1/1989 |
| EP | 0 344 877 B1 | 12/1989 |
| GB | 2 226 086 A | 6/1990 |

* cited by examiner

*Primary Examiner*—Michael Cuff
*Assistant Examiner*—Vikansha S Dwivedi
(74) *Attorney, Agent, or Firm*—Oblon, Spivak, McClelland, Maier & Neustadt, L.L.P.

(57) ABSTRACT

An exhaust casing hub includes a hub center, and an upstream flange and a downstream flange arranged on either side of the hub center. Each flange is terminated by a rim. A plurality of cuffs are arranged on the hub center so as to form an angle from the tangent toward the radial direction of 10° to 80°, preferably 15° to 75°. At least one rib is formed at the base of each cuff below a critical stress region in the cuff. The rib is joined to the downstream flange by a downstream end and to the upstream flange by an upstream end.

13 Claims, 4 Drawing Sheets

EXHAUST CASING HUB COMPRISING STRESS-DISTRIBUTING RIBS

BACKGROUND OF THE INVENTION AND DESCRIPTION OF THE PRIOR ART

The invention relates to an equipped hub of an exhaust casing comprising a hub, an upstream flange and a downstream flange arranged on either side of the hub, each flange being terminated by a rim, and a plurality of cuffs arranged on the hub and forming an angle between the tangent and the radial direction.

Aircraft jet engines comprise an exhaust casing situated downstream of the low-pressure turbine. This casing has the function of suspending the engine under the wing, of routing the service tubes and of absorbing the loads in the event of a blade loss.

The exhaust casing is frequently a mechanically welded part made up of a hub comprising substantially radially arranged cuffs and of arms welded to the cuffs. Parts are welded to the ends of the arms to form an outer shroud. Document US 2005/026847 describes an exhaust casing of this type.

However, the currently known casings have a limited life as a result of concentrations of stresses in the cuffs of the hub. These stresses reach 75 hbar such that the life of the exhaust casing is limited to 6000 to 10 000 cycles. To avoid having to change the casings on reaching these life cycles, an inspection plan is put into place. This measure is costly for air companies since it requires them to intervene beneath the wing of the aircraft and to immobilize this aircraft.

SUMMARY OF THE INVENTION

The subject of the present invention is an exhaust casing hub and an exhaust casing which overcome these disadvantages by making it possible, in particular, to increase the life of the exhaust casings.

These aims are achieved according to the invention by the addition of at least one rib formed at the base of each cuff below the region of critical stresses in the cuff, said rib being joined to the downstream flange at a downstream end and to the upstream flange at an upstream end.

In one variant embodiment, the casing hub comprises a single rib. In another variant embodiment, the hub comprises an upstream rib joined to the upstream flange and a downstream rib joined to the downstream flange.

According to another embodiment, the equipped hub of the invention is such that the length of the cuffs varies so as to be flush with the larger upstream or downstream flange over a length allowing the direct connection of the equipped hub with the shroud without an added arm.

The invention also relates to an exhaust casing comprising an equipped hub comprising a plurality of cuffs forming an angle from the tangent toward the radial direction of 10° to 80°, preferably 15° to 75°. The exhaust casing also comprises a shroud surrounding the hub, and arms welded between the shroud and each cuff. The hub is in accordance with the present invention.

Moreover, the invention relates to a turbine which comprises an exhaust casing in accordance with the present invention.

Finally, according to another aspect, the invention relates to a turbomachine which comprises an exhaust casing in accordance with the present invention.

BRIEF DESCRIPTION OF THE DRAWINGS

Other features and advantages of the present invention will become apparent on reading the description which follows of exemplary embodiments given by way of illustration with reference to the appended figures, in which.

DESCRIPTION OF THE PREFERRED EMBODIMENTS

Figure 1:
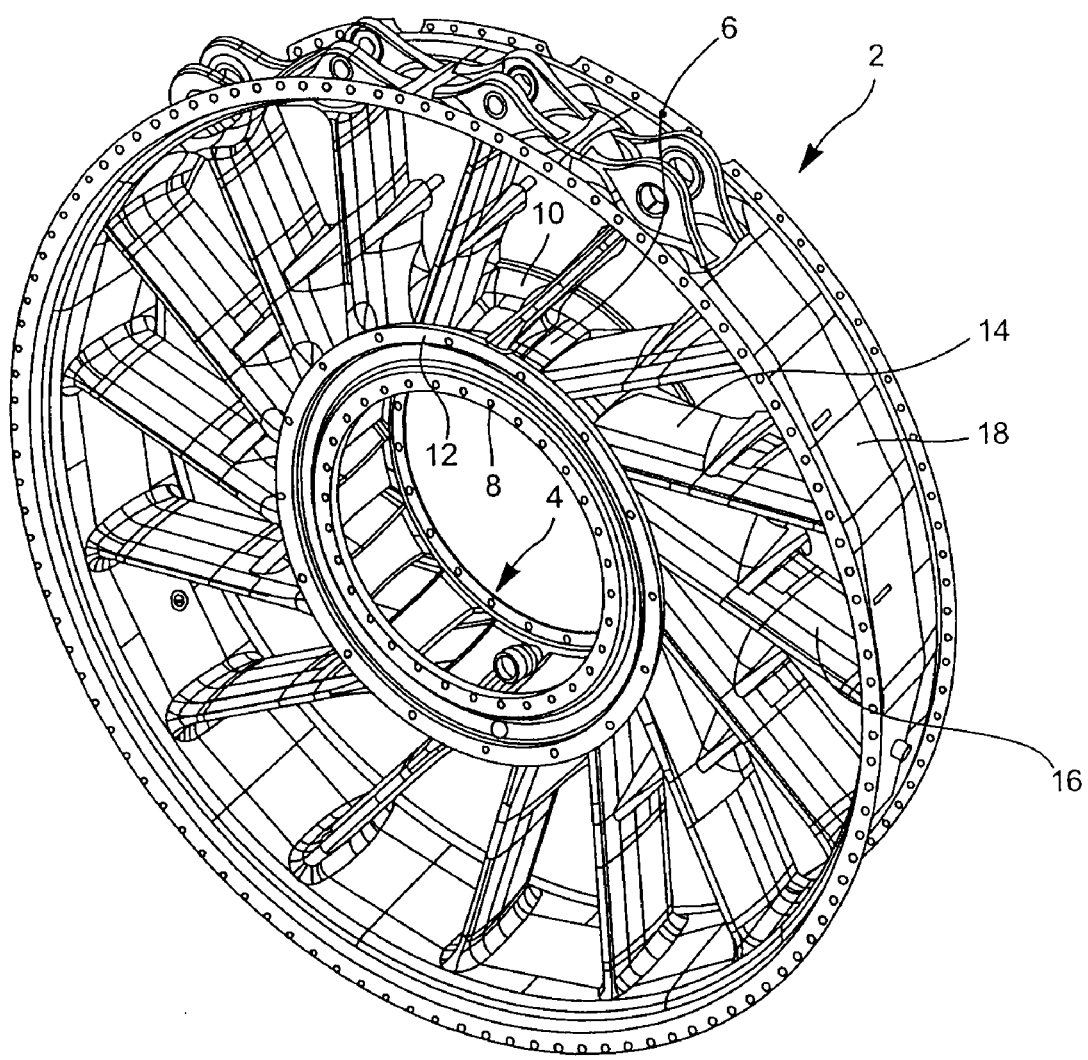
FIG. 1 is a perspective view of an exhaust casing in accordance with the present invention.

In FIG. 1, the general reference 2 designates an exhaust casing in accordance with the present invention. This exhaust casing comprises a hub designated by the reference 4. The hub 4 comprises a hub center 6 and, on either side of this hub center 6, an upstream flange 8 and a downstream flange 10 which are terminated by a rim 12. Cuffs 14 are formed on the hub center 6. In the exemplary embodiment represented, the number of these cuffs is sixteen. The hub 4 is a casting. An arm 16 is welded to the end of each of the cuffs 14. There are thus sixteen arms in the exemplary embodiment represented. The circular parts 18, equal in number to the number of arms, are welded to the ends of the arms 16 so as to form a circular shroud which completes the exhaust casing.

Figure 2:
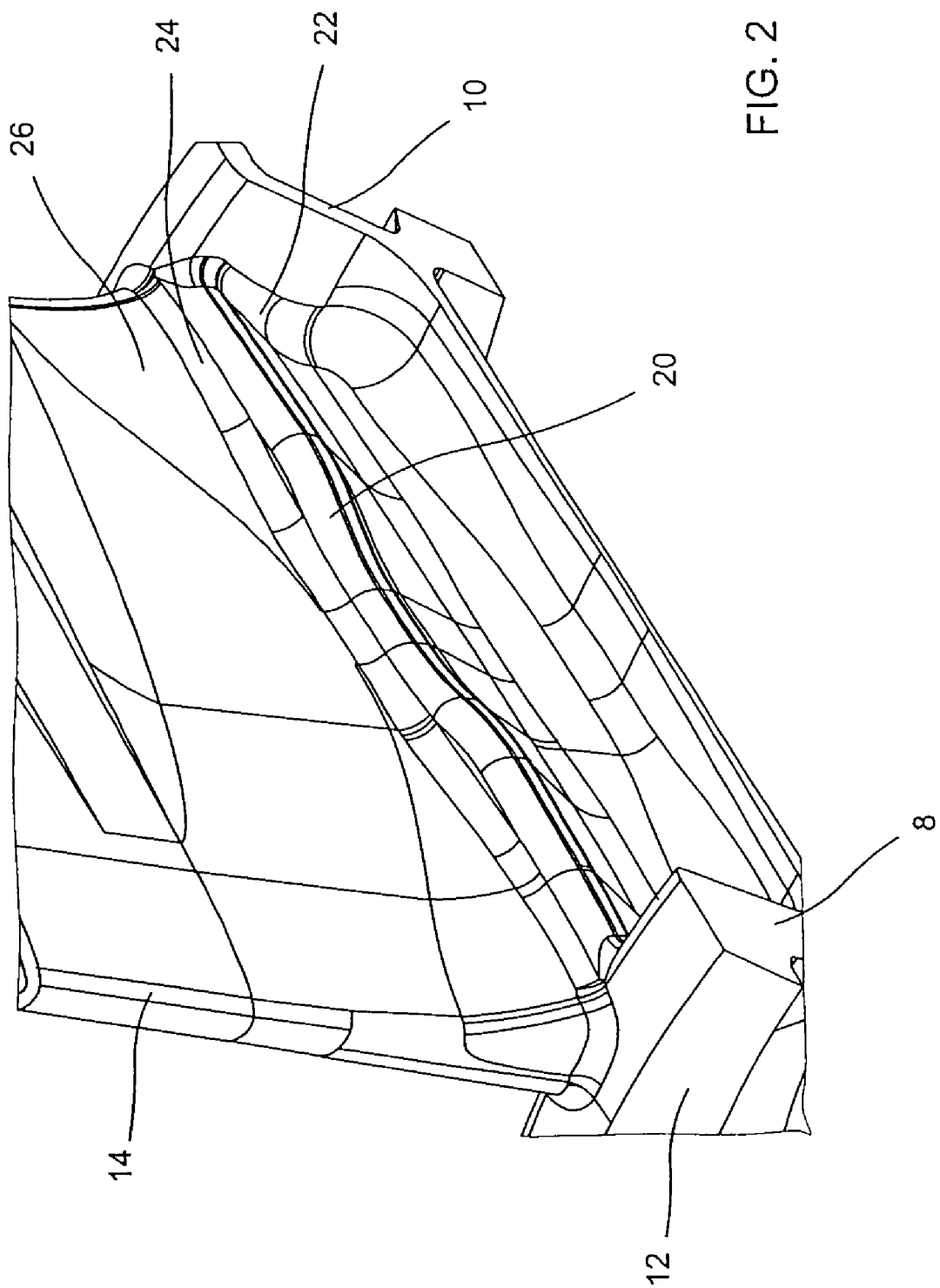
FIGS. 2 and 3 are a top view and a side view, respectively, of an exhaust casing hub in accordance with the present invention.
Figure 3:
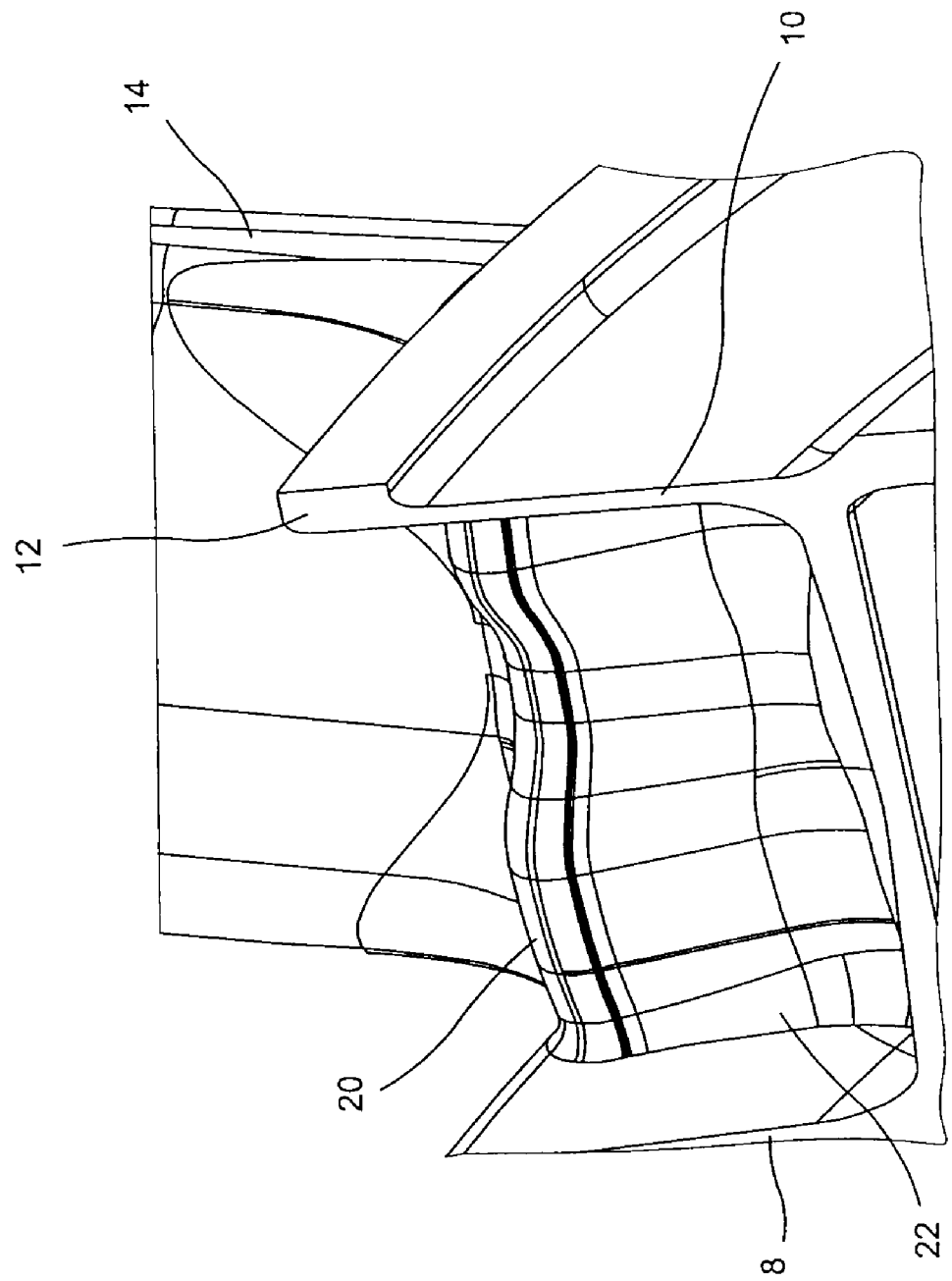

FIGS. 2 and 3 show a top view and a side view, respectively, of a rib 20 formed in the hub of the exhaust casing represented in FIG. 1. The rib 20 extends from the upstream flange 8 to the downstream flange 10. It is joined to the upstream flange 8 and to the downstream flange 10 by fillets 22. In the same way, it is joined to the cuffs 14 by a fillet 24 at the base of each of the cuffs. Across its height, this rib is placed substantially below the point of maximum stresses 26. Calculations have made it possible to show that the stresses are very well distributed with this rib. The maximum stress drops to 26 hbar, which means that a life exceeding 50 000 cycles is conceivable, this being above the upper value currently adopted.

Figure 4:
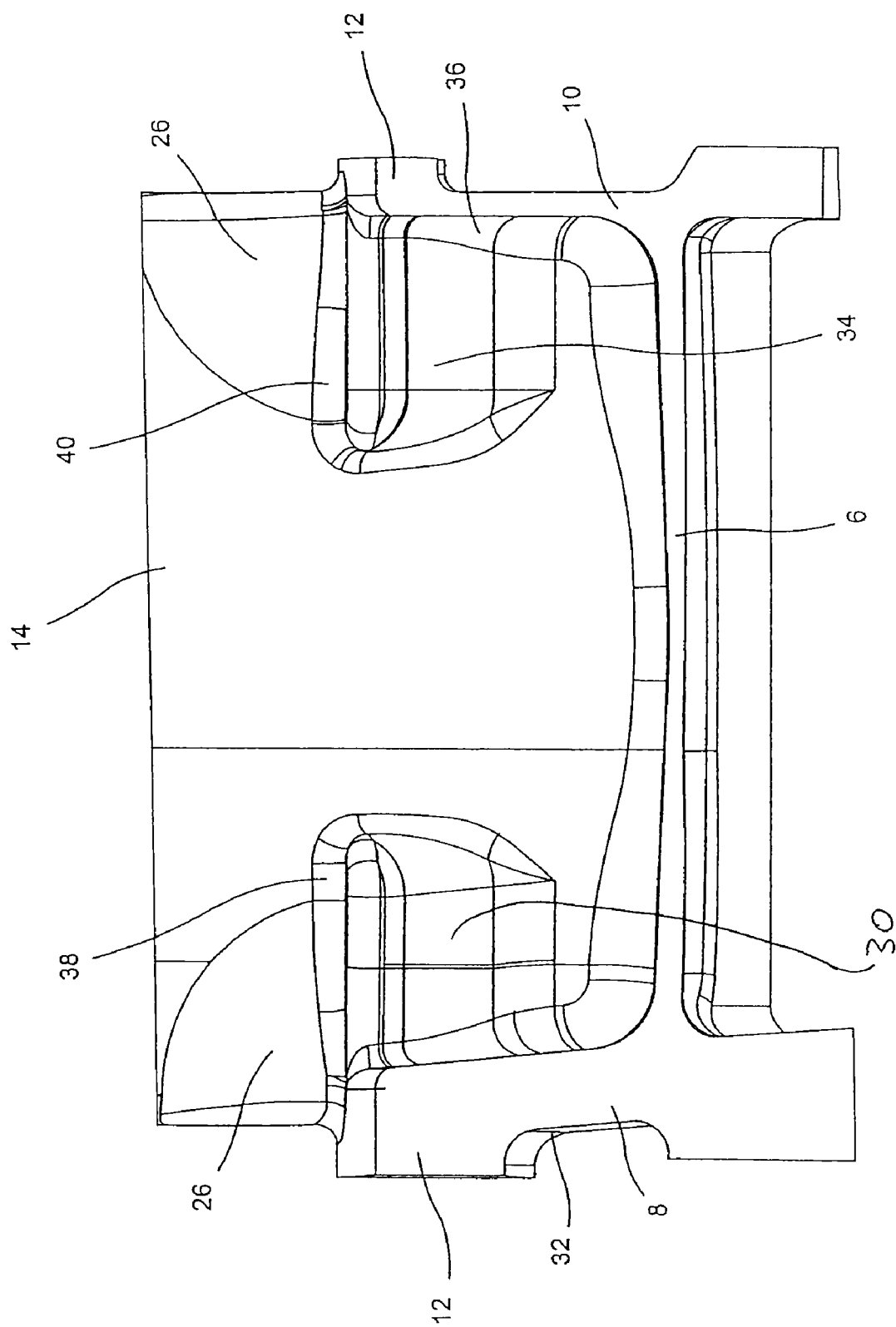
FIG. 4 is a front view of a variant embodiment of the invention.

FIG. 4 shows a front view of a double rib forming part of an exhaust casing in accordance with the present invention.

The reference 30 designates an upstream rib joined to the upstream flange 8 by a joining radius 32. The reference 34 designates a downstream rib joined to the downstream flange 10 by a joining radius 36. Likewise, the upstream rib 30 joins to the cuff 14 by a joining radius 38, while the downstream rib 34 joins to the cuff 14 by a joining radius 40. Across their height, the ribs 30 and 34 are situated below a region 26 of critical stresses in the cuff 14.

Measurements have made it possible to show that the stresses are also very well distributed with these two ribs. The maximum stress drops to 31.5 hbar, which means that a life exceeding 36 000 cycles is conceivable, this being above the upper value currently adopted.

The invention claimed is:

1. An equipped hub of an exhaust casing comprising:
a hub center;
an upstream flange disposed on an upstream side of the hub center;
a downstream flange disposed on a downstream side of the hub center; and
a plurality of cuffs extending radially from the hub center and arranged circumferentially around the hub center, wherein at least one rib is provided at an exterior of a base of each cuff so as to surround the cuff below a maximum stress location in the cuff, said rib being joined to the downstream flange at a downstream end of the rib and to the upstream flange at an upstream end of the rib.

2. The equipped hub as claimed in claim 1, further comprising an upstream rib joined to the upstream flange and a downstream rib joined to the downstream flange.

3. The equipped hub as claimed in claim 1, wherein a first end of the cuff directly connects with the upstream flange and the downstream flange, and a second end of the cuff directly connects with a circular part so as to form a circular shroud.

4. The equipped hub as claimed in claim 1, wherein each cuff arranged on the hub center is disposed at an angle of 10° to 80° between a tangent of the hub center and a radial direction of the hub center.

5. The equipped hub as claimed in claim 4, wherein the angle of each cuff is 15° to 75°.

6. An exhaust casing comprising:
   an equipped hub comprising a plurality of cuffs and a shroud surrounding the hub;
   arms disposed at an angle of 10° to 80° between a tangent of the hub and a radial direction of the hub, said arms being welded between the shroud and each cuff,
   wherein the hub is in accordance with claim 1.

7. A turbine which comprises an exhaust casing as claimed in claim 6.

8. A turbomachine which comprises an exhaust casing as claimed in claim 6.

9. The exhaust casing as claimed in claim 6, wherein the angle of the arms is 15° to 75°.

10. The equipped hub as claimed in claim 1, wherein the equipped hub is disposed downstream of a low pressure turbine.

11. The exhaust casing as claimed in claim 1, wherein the at least one rib provided at the exterior of the base of each cuff entirely surrounds the cuff.

12. An equipped hub of an exhaust casing comprising:
    a hub center;
    an upstream flange disposed on an upstream side of the hub center;
    a downstream flange disposed on a downstream side of the hub center; and
    a plurality of cuffs arranged circumferentially around the hub center,
    wherein at least one rib is provided at an exterior of a base of each cuff below a maximum stress location in the cuff, said rib being joined to the downstream flange at a downstream end of the rib and to the upstream flange at an upstream end of the rib, and
    wherein the rib is joined to the flange via a fillet, and the fillet directly contacts an inner face of the upstream flange.

13. An equipped hub of an exhaust casing comprising:
    a hub center;
    an upstream flange disposed on an upstream side of the hub center;
    a downstream flange disposed on a downstream side of the hub center; and
    a plurality of cuffs arranged circumferentially around the hub center,
    wherein at least one rib is provided at an exterior of a base of each cuff below a maximum stress location in the cuff, said rib being joined to the downstream flange at a downstream end of the rib and to the upstream flange at an upstream end of the rib, and
    wherein the rib is joined to the flange via a fillet, and the fillet directly contacts an inner face of the downstream flange.

* * * * *